(12) United States Patent
Cheng

(10) Patent No.: US 11,494,005 B2
(45) Date of Patent: Nov. 8, 2022

(54) MOUSE DEVICE

(71) Applicant: Chicony Electronics Co., Ltd., New Taipei (TW)

(72) Inventor: Yu-Chih Cheng, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/455,661

(22) Filed: Nov. 18, 2021

(65) Prior Publication Data

US 2022/0300095 A1  Sep. 22, 2022

(30) Foreign Application Priority Data

Mar. 17, 2021  (TW) .................................. 110109620

(51) Int. Cl.
*G06F 3/0354* (2013.01)
(52) U.S. Cl.
CPC ................................ *G06F 3/03543* (2013.01)
(58) Field of Classification Search
CPC .................................................. G06F 3/03543
See application file for complete search history.

(56) References Cited

U.S. PATENT DOCUMENTS

| 7,075,516 | B2 | 7/2006 | Bohn |
| 7,079,110 | B2 | 7/2006 | Ledbetter et al. |
| 7,187,358 | B2 * | 3/2007 | Ledbetter .............. G06F 3/0213 345/169 |
| 7,199,785 | B2 | 4/2007 | Ledbetter et al. |
| 7,205,977 | B2 | 4/2007 | Ledbetter et al. |
| 7,616,188 | B1 * | 11/2009 | Blandin .............. G06F 3/03543 345/166 |
| 11,175,752 | B1 * | 11/2021 | Chu ...................... G06F 3/0362 |
| 2003/0025673 | A1 * | 2/2003 | Ledbetter ............ G06F 3/03543 345/163 |
| 2004/0041790 | A1 * | 3/2004 | O'Keeffe ............ G06F 3/03543 345/163 |
| 2004/0174336 | A1 * | 9/2004 | Bohn .................... G06F 3/0312 345/156 |
| 2005/0264520 | A1 * | 12/2005 | Wang .................... G06F 3/0312 345/156 |

(Continued)

FOREIGN PATENT DOCUMENTS

| TW | I324740 B | 5/2010 |
| TW | I665586 B | 7/2019 |

*Primary Examiner* — Ariel A Balaoing
(74) *Attorney, Agent, or Firm* — CKC & Partners Co., LLC

(57) ABSTRACT

A mouse device includes a housing, a keyswitch, a swing arm, a wheel seat, and a wheel. The housing includes a bottom board. The keyswitch is located over the bottom board and includes a button. The swing arm includes a pivotal portion and first and second extending portions. The pivotal portion is pivotally connected to the bottom board. The first extending portion is connected to the pivotal portion and abuts against the button. The second extending portion is connected to the pivotal portion. The wheel seat is located over the bottom board and configured to laterally swing toward the second extending portion to move the second extending portion, so as to rotate the swing arm to press the button by the first extending portion. The swing arm is located at a side of the wheel seat. The wheel is rotatably disposed in the wheel seat.

12 Claims, 9 Drawing Sheets

(56) References Cited

U.S. PATENT DOCUMENTS

| | | | | |
|---|---|---|---|---|
| 2010/0141582 A1* | 6/2010 | Wu | ................. | G06F 3/0362 |
| | | | | 345/163 |
| 2013/0215031 A1* | 8/2013 | Peng | ................. | G06F 3/03543 |
| | | | | 345/163 |
| 2022/0207970 A1* | 6/2022 | Mitsui | ................. | G08B 21/06 |

* cited by examiner

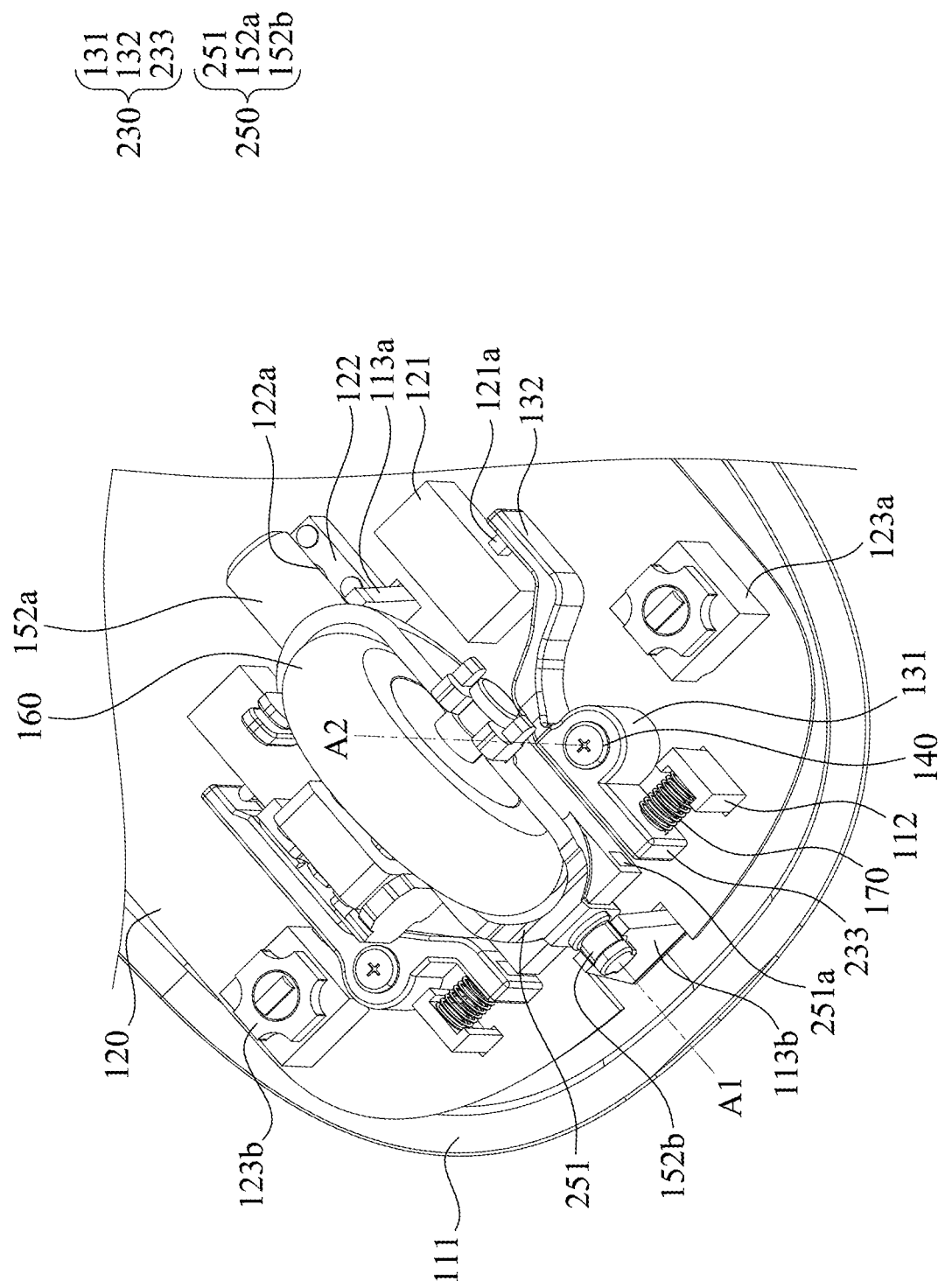

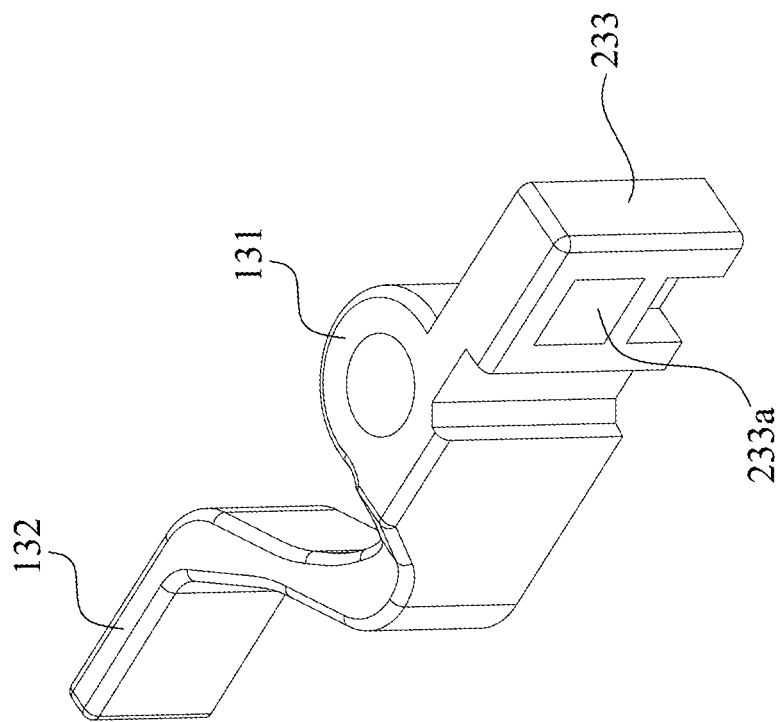

MOUSE DEVICE

CROSS-REFERENCE TO RELATED APPLICATION

This application claims priority to Taiwan Application Serial Number 110109620, filed Mar. 17, 2021, which is herein incorporated by reference.

BACKGROUND

Technical Field

The present disclosure relates to a mouse device.

Description of Related Art

Mouse devices are important external input devices of computers. By moving a mouse device, a user can quickly move the cursor on the computer screen. In this way, the user is allowed to perform quick input operations such as confirming and canceling to the computer through operations of the mouse device. Therefore, the mouse device greatly improves the convenience for the user to operate the computer.

At present, there is a mouse device having a wheel that can swing laterally, and a rib arm extends on each of both sides of the wheel seat. When a finger touches the wheel and swings the wheel seat, the left and right rib arms will press the left and right keyswitches, thereby generating the function of moving the scroll bar in the software to the left and right. However, this design is not conducive to the flexibility of the internal component layout and the space usage efficiency of the mouse device.

Accordingly, how to provide a mouse device to solve the aforementioned problems becomes an important issue to be solved by those in the industry.

SUMMARY

An aspect of the disclosure is to provide a mouse device that can efficiently solve the aforementioned problems.

According to an embodiment of the disclosure, a mouse device includes a housing, a keyswitch, a swing arm, a wheel seat, and a wheel. The housing includes a bottom board. The keyswitch is located over the bottom board and includes a button. The swing arm includes a pivotal portion, a first extending portion, and a second extending portion. The pivotal portion is pivotally connected to the bottom board. The first extending portion is connected to the pivotal portion and abuts against the button. The second extending portion is connected to the pivotal portion. The wheel seat is located over the bottom board and configured to laterally swing toward the second extending portion to move the second extending portion, so as to rotate the swing arm to press the button by the first extending portion. The swing arm is located at a side of the wheel seat. The wheel is rotatably disposed in the wheel seat.

In an embodiment of the disclosure, the second extending portion abuts against the wheel seat.

In an embodiment of the disclosure, the first extending portion has a contact point contacting the button. The second extending portion has a trigger point configured to be forced by the wheel seat.

In an embodiment of the disclosure, a distance from the contact point to a rotation axis of the swing arm is greater than a distance from the trigger point to the rotation axis.

In an embodiment of the disclosure, the wheel seat includes a first magnet. The second extending portion includes a second magnet. Identical poles of the first magnet and the second magnet are opposite to each other.

In an embodiment of the disclosure, the mouse device further includes a position-returning member. The position-returning member is disposed at a side of the second extending portion away from the wheel seat and configured to return the second extending portion toward the wheel seat.

In an embodiment of the disclosure, the housing further includes a blocking wall disposed on the bottom board. The second extending portion is located between the wheel seat and the blocking wall. The position-returning member is disposed between the second extending portion and the blocking wall.

In an embodiment of the disclosure, the keyswitch and the wheel seat are located at an identical side of the swing arm.

In an embodiment of the disclosure, the housing further includes a supporting structure. The supporting structure is disposed on the bottom board and includes two retaining walls. The wheel seat includes an extending pillar. The extending pillar is retained between the two retaining walls.

In an embodiment of the disclosure, the extending pillar includes an insert piece. An accommodating groove and an insertion groove communicated to each other are formed between the two retaining walls. The accommodating groove accommodates a part of the extending pillar. The insertion groove is located between the accommodating groove and the bottom board and configured to be inserted by the insert piece.

In an embodiment of the disclosure, when the insert piece is located outside the insertion groove. The extending pillar is rotatably retained between the two retaining walls. When the insert piece inserts into the insertion groove, the insert piece is engaged between two inner walls of the insertion groove.

In an embodiment of the disclosure, a junction between the accommodating groove and the insertion groove has a chamfered structure.

In an embodiment of the disclosure, the mouse device further includes another keyswitch and another swing arm. The another keyswitch is located over the bottom board and includes another button. The another swing arm includes another pivotal portion, another first extending portion, and another second extending portion. The another pivotal portion is pivotally connected to the bottom board. The another first extending portion is connected to the another pivotal portion and abutting against the another button. The another second extending portion is connected to the another pivotal portion. The another swing arm is located at another side of the wheel seat, and the side and the another side of the wheel seat are opposite to each other.

Accordingly, in the mouse device of the present disclosure, the wheel seat can rotate the swing arm by swinging laterally, so as to press the button of the keyswitch through the rotating swing arm. Hence, the installation position of the keyswitch relative to the wheel seat can be arbitrarily changed by adjusting the appearance of the swing arm, thereby effectively increasing the flexibility of the internal component layout and the space utilization efficiency of the mouse device. By making the distance between the contact point between the swing arm and the button and the rotation axis of the swing arm greater than the distance from the trigger point between the wheel seat and the swing arm to the rotation axis, the force required to be applied and the distance to be swayed when the wheel seat triggers the keyswitch can be increased, thereby reducing the accidental trigger of the keyswitch when the wheel is vertically pressed. By designing the insertion groove on the supporting structure on the bottom board for inserting the insert piece of the extension pillar of the wheel seat, the wheel seat can be effectively prevented from swinging when the wheel is vertically pressed, thereby avoiding accidentally triggering the keyswitch.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5 is a partial perspective view of some components of a mouse device according to another embodiment of the present disclosure; and FIG. 6 is a perspective view of a swing arm in FIG. 5.

DETAILED DESCRIPTION

Figure 1:
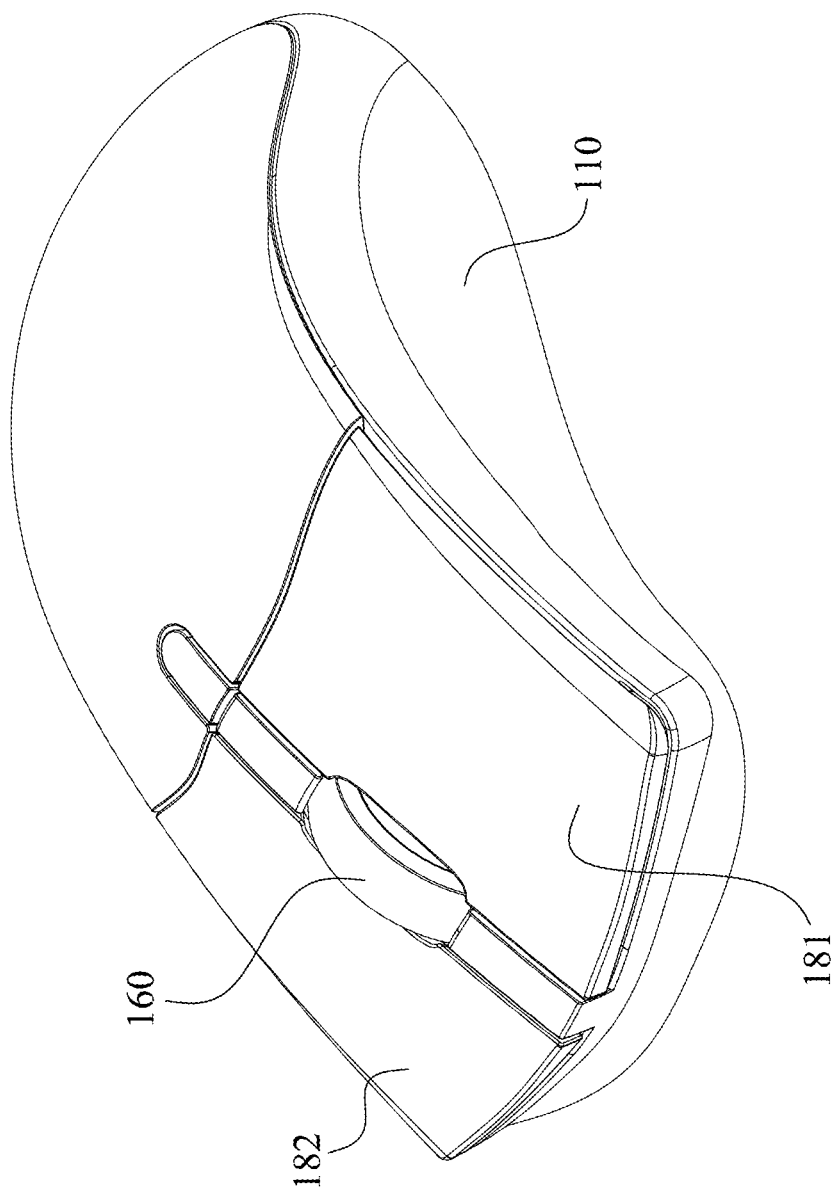
FIG. 1 is a perspective view of a mouse device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
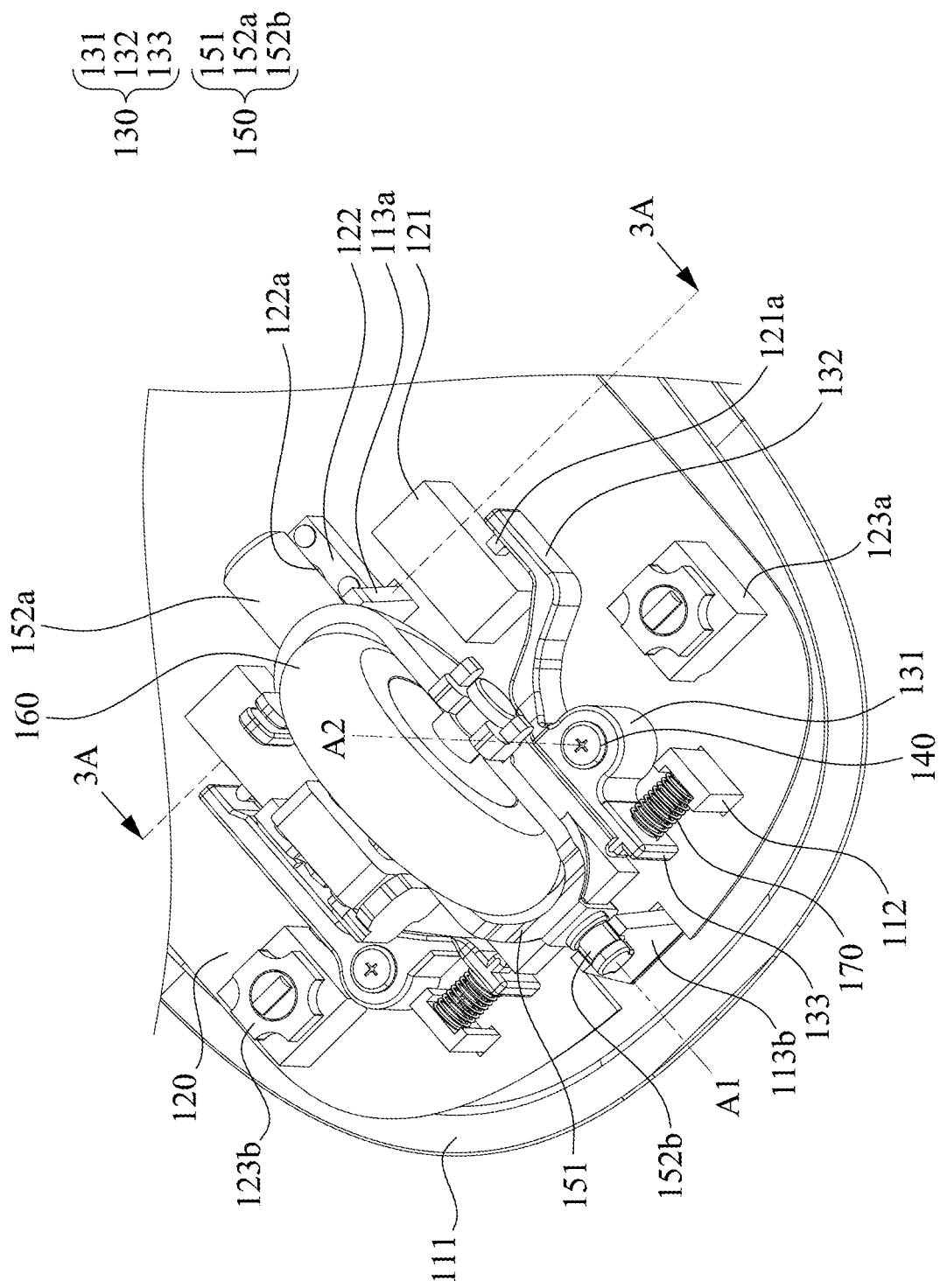
FIG. 2 is a partial perspective view of some components of the mouse device in FIG. 1.

Reference is made to FIGS. 1 and 2. FIG. 1 is a perspective view of a mouse device 100 according to an embodiment of the present disclosure. FIG. 2 is a partial perspective view of some components of the mouse device 100 in FIG. 1. As shown in FIGS. 1 and 2, in the present embodiment, the mouse device 100 includes a housing 110, a circuit board 120, two swing arms 130 (only one is shown in FIG. 2), a wheel seat 150, and a wheel 160. The housing 110 includes a bottom board 111. The circuit board 120, the swing arms 130, and the wheel seat 150 are disposed in the housing 110 and located over the bottom board 111. The circuit board 120 has two keyswitches 121 (only one is shown in FIG. 2) disposed thereon. The two keyswitches 121 are respectively located at two sides of the wheel seat 150. Each of the keyswitches 121 includes a button 121a. The two swing arms 130 are respectively located at the two sides of the wheel seat 150. Each of the swing arms 130 includes a pivotal portion 131, a first extending portion 132, and a second extending portion 133. The pivotal portion 131 is pivotally connected to the bottom board 111 based on a rotation axis A2 passing through the bottom board 111, so that the swing arm 130 can rotate around the rotation axis A2. The first extending portion 132 is connected to the pivotal portion 131 and abuts against the button 121a of the corresponding keyswitch 121. The second extending portion 133 is connected to the pivotal portion 131. Specifically, the first extending portion 132 and the second extending portion 133 extend in opposite directions from opposite sides of the pivotal portion 131 respectively. The first extending portion 132 extends toward the rear of the mouse device 100 relative to the pivotal portion 131, and the second extending portion 133 extends toward the front of the mouse device 100 relative to the pivotal portion 131. The wheel seat 150 is configured to laterally swing toward the second extending portion 133 to move the second extending portion 133, so as to rotate the swing arm 130 to press the button 121a of the keyswitch 121 by the first extending portion 132. The two swing arms 130 are respectively located at the two sides of the wheel seat 150. The wheel seat 150 includes an accommodating frame 151. The wheel 160 is rotatably accommodated at the inner edge of the accommodating frame 151.

With the foregoing configurations, the installation position of the keyswitches 121 relative to the wheel seat 150 can be arbitrarily changed by adjusting the appearance of the swing arms 130, thereby effectively increasing the flexibility of the internal component layout and the space utilization efficiency of the mouse device 100.

For example, as shown in FIG. 2, the keyswitch 121 and the wheel seat 150 are located at an identical side of the corresponding swing arm 130. Under this configuration, the keyswitch 121 can be disposed on the rear side of the wheel seat 150, and the swing arm 130 can extend from the front side to the rear side of the wheel seat 150, thereby freeing the space on the left and right sides of the wheel seat 150 for layout of other components. In practical applications, the shape of the swing arm 130 can also be adjusted to an L-shape or U-shape according to the installation position of the corresponding keyswitch 121 relative to the wheel seat 150, but the disclosure is not limited in this regard.

As shown in FIG. 2, in the present embodiment, the mouse device 100 further includes a fixing member 140. The fixing member 140 fixes the swing arm 130 onto the bottom board 111. Specifically, the swing arm 130 is rotatably sleeved on the outer edge of the fixing member 140 to rotate around the aforementioned rotation axis A2. In some embodiments, the fixing member 140 is a screw fixed to the bottom board 111, but the disclosure is not limited in this regard. In some other embodiments, the fixing member 140 and the bottom board 111 form a unitary structure made of plastic through an injection molding process, but the present disclosure is not limited in this regard.

Furthermore, as shown in FIG. 2, in the present embodiment, the housing 110 further includes supporting structures 113a, 113b. The supporting structures 113a, 113b are disposed on the bottom board 111. The wheel seat 150 includes extending pillars 152a, 152b. The extending pillars 152a, 152b are respectively connected to opposite sides of the accommodating frame 151 and extend in opposite directions. With the extending pillars 152a, 152b rotatably supported on the supporting structures 113a, 113b respectively, the wheel seat 150 can rotate around the rotation axis A1 passing through the extending pillars 152a, 152b. Hence, the accommodating frame 151 of the wheel seat 150 can swing left and right based on the rotation axis A1 to achieve the purpose of laterally swinging toward and away from the second extending portion 133.

In some embodiments, the extending pillars 152a, 152b and the bottom board 111 form a unitary structure made of plastic through an injection molding process, but the present disclosure is not limited in this regard.

Figure 3A:
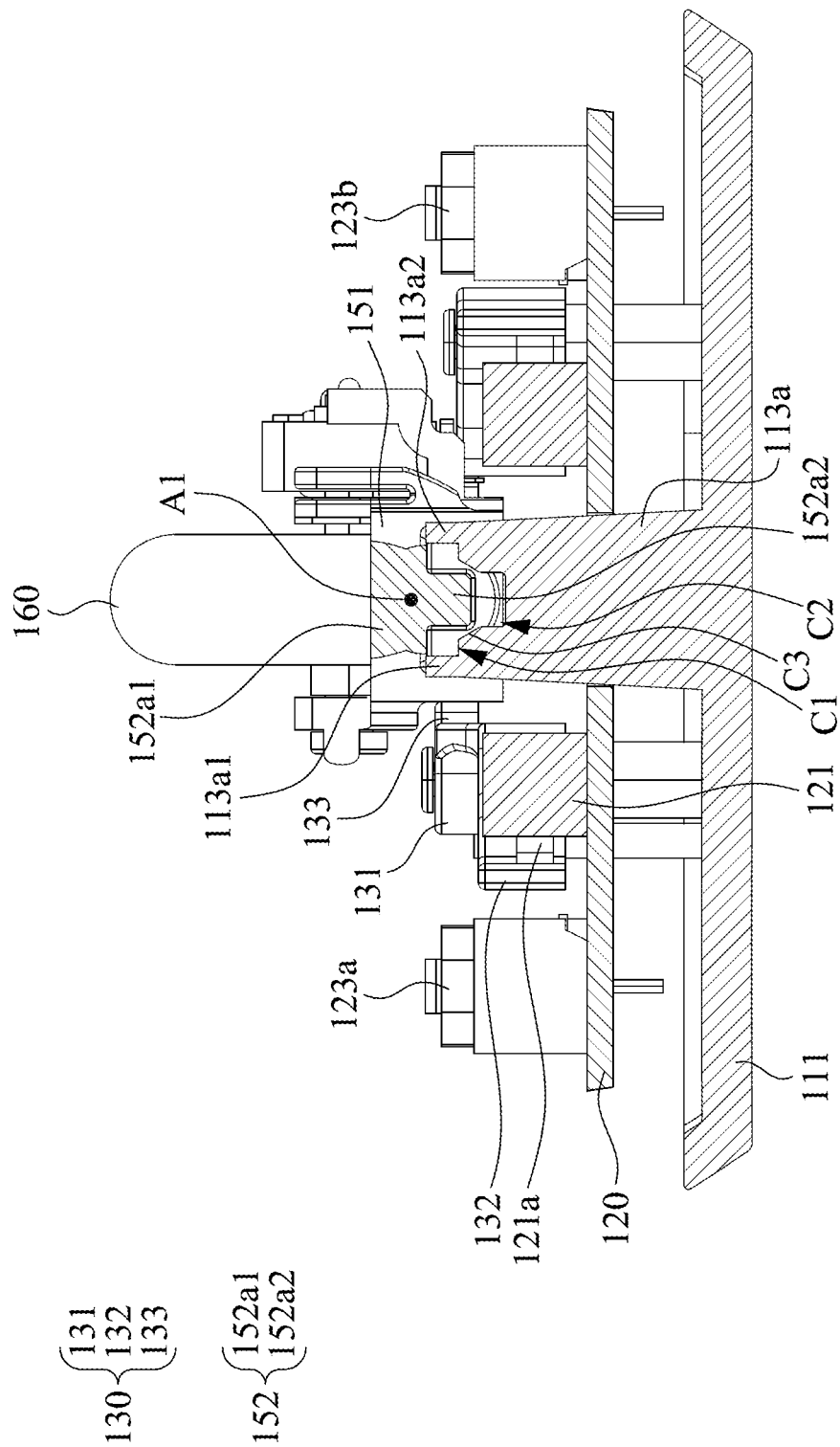
FIG. 3A is a cross-sectional view of the structure in FIG. 2 viewed along line 3A-3A.
Figure 3B:
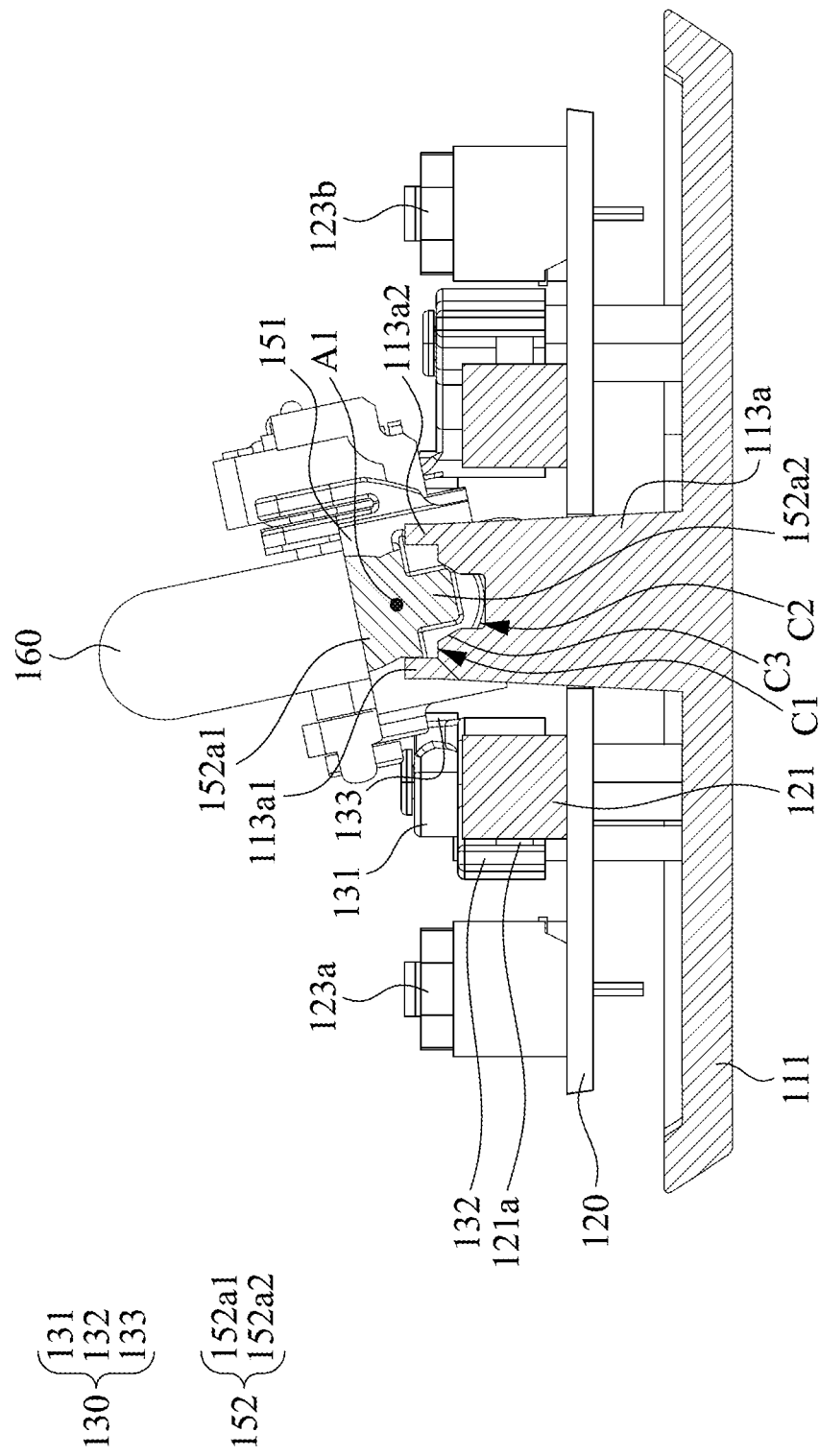
FIG. 3B is another cross-sectional view of the structure in FIG. 2 viewed along line 3A-3A.

Reference is made to FIGS. 3A and 3B. FIG. 3A is a cross-sectional view of the structure in FIG. 2 viewed along line 3A-3A. Specifically, FIG. 3A is a cross-sectional view showing that the wheel 160 is not compressed and not deflected. FIG. 3B is another cross-sectional view of the structure in FIG. 2 viewed along line 3A-3A. Specifically, FIG. 3B is a cross-sectional view of the wheel 160 swinging to one side (left side). As shown in FIGS. 2 to 3B, in the present embodiment, since the second extending portion 133 of the swing arm 130 directly abuts against the wheel seat 150, the accommodating frame 151 that swings laterally toward the second extending portion 133 pushes the second extending portion 133, so that the swing arm 130 rotates around the rotation axis A2 to press the button 121a of the keyswitch 121 by the first extending portion 132. In practical applications, a user can swing the wheel seat 150 to the left and right by pushing a finger laterally against the wheel 160, thereby respectively triggering the keyswitches 121 located on both sides of the wheel seat 150. When the user's finger leaves the wheel 160, the button 121a of the keyswitch 121 will rebound to make the swing arm 130 reversely rotate, so that the wheel seat 150 is pushed back by the swing arm 130 to return to the initial position when it has not been pushed laterally (such as the position of the swing arm 130 in FIG. 2). For example, in the present embodiment, when the wheel seat 150 moves to the left, the left swing arm 130 can trigger the keyswitch 121 located on the left side of the wheel seat 150; and when the wheel seat 150 moves to the right, the swing arm 130 on the right side can trigger the keyswitch 121 on the right side of the wheel seat 150.

Figure 3C:
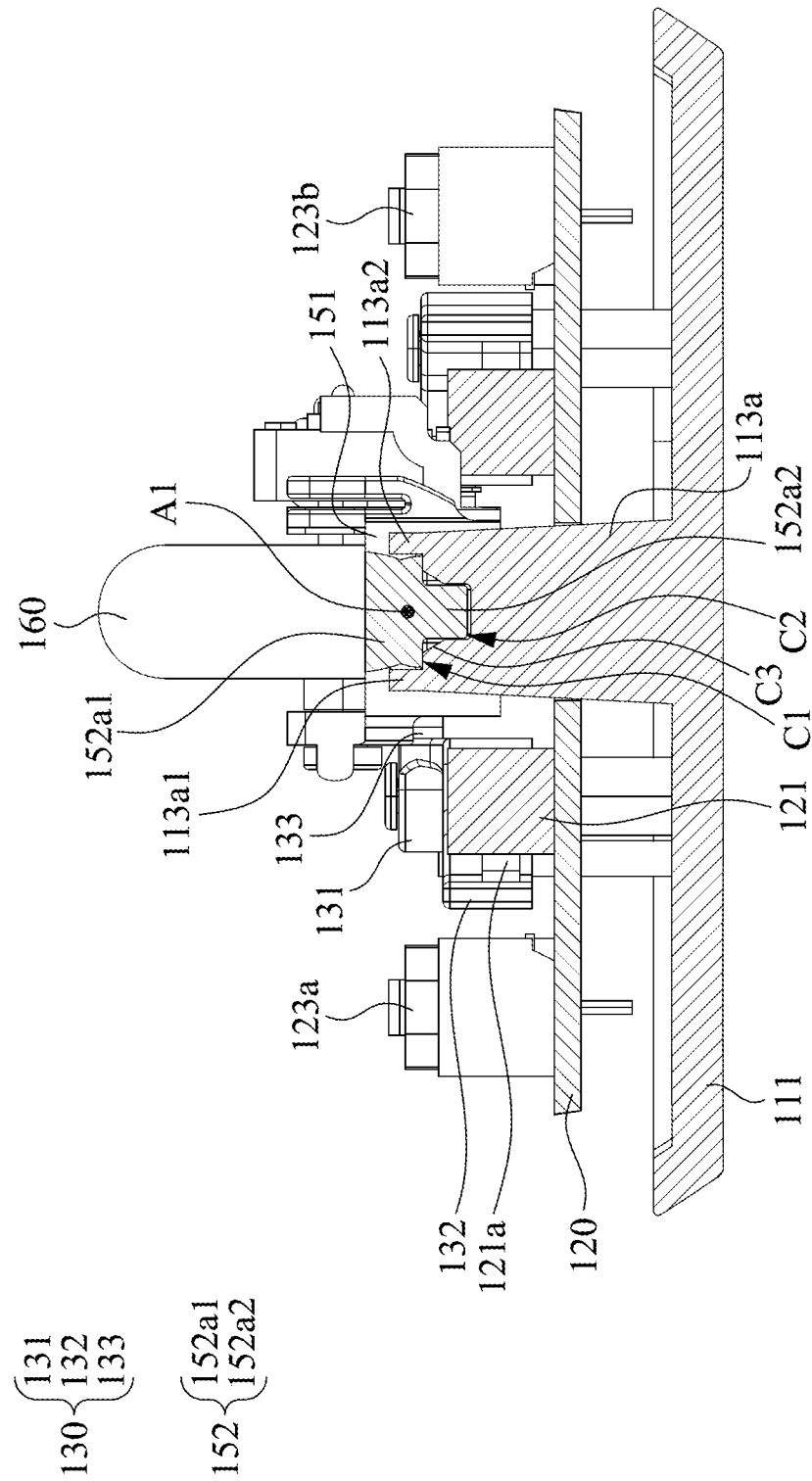
FIG. 3C is another cross-sectional view of the structure in FIG. 2 viewed along line 3A-3A.

Reference is made to FIG. 3C. FIG. 3C is another cross-sectional view of the structure in FIG. 2 viewed along line 3A-3A. Specifically, FIG. 3C is a cross-sectional view of the wheel 160 after being pressed down. As shown in FIG. 2, FIG. 3A and FIG. 3C, in the present embodiment, the circuit board 120 is further provided with a keyswitch 122 thereon. The keyswitch 122 is located under the wheel seat 150 and includes a button 122a. In detail, when the wheel 160 is not pressed, the extending pillar 152a of the wheel seat 150 is located above the button 122a of the keyswitch 122 and separated by a distance; and when the wheel 160 is pressed, the extending pillar 152a of the wheel seat 150 can press the button 122a to trigger the keyswitch 122. The supporting structure 113a includes two retaining walls 113a1, 113a2. The extending pillar 152a is retained between the two retaining walls 113a1, 113a2, so as to be guided by the two retaining walls 113a1, 113a2 when moving toward and away from the keyswitch 122. In practical applications, the user can press the wheel 160 with a finger to push the extending pillar 152a of the wheel seat 150 toward the keyswitch 122. When the user's finger leaves the wheel 160, the button 122a of the keyswitch 122 will rebound to lift the extending pillar 152a, so that the wheel seat 150 will be returned to the initial position when it has not been pressed downward (such as the position of the swing arm 130 in FIG. 3A). It can be seen that the extending pillar 152a not only can rotate relative to the supporting structure 113a based on the rotation axis A1, but can also move linearly toward and away from the bottom board 111.

In addition, as shown in FIG. 2, the supporting structure 113b supports and retains the extending pillar 152b so that the extending pillar 152b can rotate relative to the supporting structure 113b based on the rotation axis A1.

As shown in FIGS. 3A to 3C, in the present embodiment, the extending pillar 152a includes a pillar body 152a1 and an insert piece 152a2 connected to each other. The pillar body 152a1 substantially extends away from the accommodating frame 151 along the rotation axis A1. The insert piece 152a2 extends downward from the bottom of the pillar body 152a1. An accommodating groove C1 and an insertion groove C2 communicated to each other are formed between the two retaining walls 113a1, 113a2. The accommodating groove C1 accommodates a part of the pillar body 152a1 of the extending pillar 152a. The insertion groove C2 is located between the accommodating groove C1 and the bottom board 111 and configured to be inserted by the insert piece 152a2. Specifically, a width of the accommodating groove C1 is larger than a width of the insertion groove C2. When the insert piece 152a2 is located outside the insertion groove C2, the extending pillar 152a is rotatably retained between the two retaining walls 113a1, 113a2, as shown in FIGS. 3A and 3B. When the insert piece 152a2 is inserted into the insertion groove C2, the insert piece 152a2 is engaged between the two inner walls of the insertion groove C2, as shown in FIG. 3C. Hence, when the user presses the wheel 160 with a finger to cause the insert piece 152a2 of the wheel seat 150 to press down and trigger the keyswitch 122, the supporting structure 113a can prevent the wheel seat 150 from swinging based on the rotation axis A1 by engaging the insert piece 152a2 by the insertion groove C2, so as to avoid accidentally triggering the keyswitch 121. In addition, this structural configuration can ensure that the wheel 160 can stably contact the button 122a of the keyswitch 122 when the wheel 160 is pushed down.

Figure 3D:
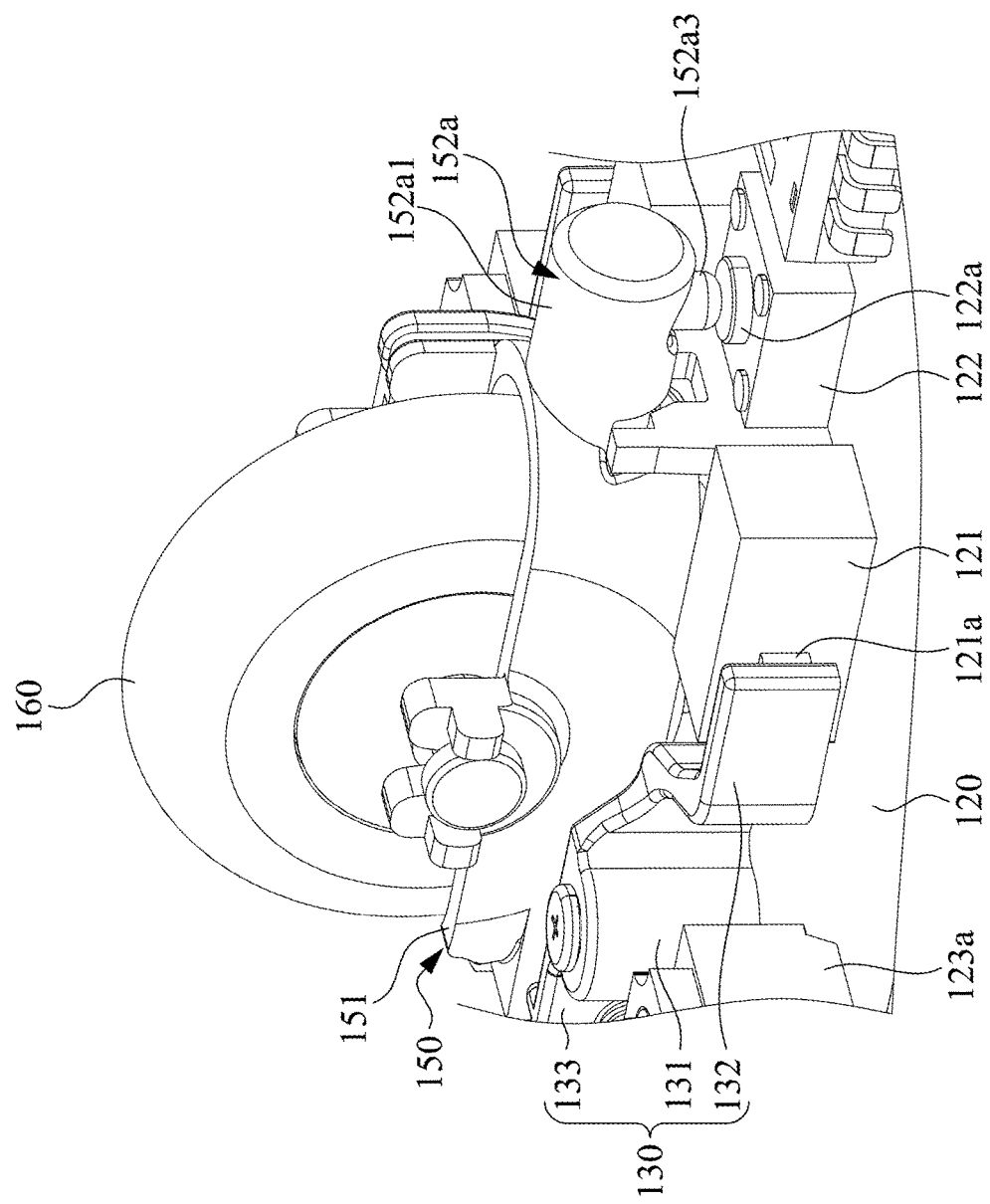
FIG. 3D is a partial perspective view of the structure in FIG. 2 from another perspective.

Reference is made to FIG. 3D. FIG. 3D is a partial perspective view of the structure in FIG. 2 from another perspective. Specifically, FIG. 3D is a schematic diagram showing that the wheel 160 is not pressed and not deflected. As shown in FIG. 3D, in the present embodiment, the extending pillar 152a further includes a convex portion 152a3 extending downward from the bottom of the pillar body 152a1. The convex portion 152a3 is configured to abut against the button 122a of the keyswitch 122. Hence, when the wheel 160 is not pressed, the convex portion 152a3 is located above the button 122a of the keyswitch 122 and separated by a distance; when the wheel 160 is pressed, the convex portion 152a3 presses the button 122a to trigger the keyswitch 122. This structural configuration can ensure that the convex portion 152a3 and the button 122a can be pressed and contacted accurately, but the disclosure is not limited in this regard.

As shown in FIGS. 3A to 3C, in the present embodiment, a junction between the accommodating groove C1 and the insertion groove C2 has a chamfered structure C3. A width of the chamfered structure C3 is gradually reduced from the accommodating groove C1 toward the insertion groove C2. The chamfered structure C3 can increase the smoothness of the insert piece 152a2 in the process of inserting the insert piece 152a2 into the insertion groove C2. In some embodiments, the chamfered structure C3 is an inclined surface inclined relative to the inner walls of the accommodating groove C1 and the insertion groove C2, but the disclosure is not limited in this regard.

As shown in FIGS. 1 and 2, the mouse device 100 further includes a left button 181 and a right button 182. The left button 181 and the right button 182 are movably engaged with the housing 110 and configured to move toward and away from the bottom board 111. The circuit board 120 is further provided with keyswitches 123a, 123b thereon. The keyswitches 123a, 123b are located on opposite sides of the wheel seat 150 and configured to be triggered by the pressed left button 181 and the right button 182, respectively.

Figure 4:
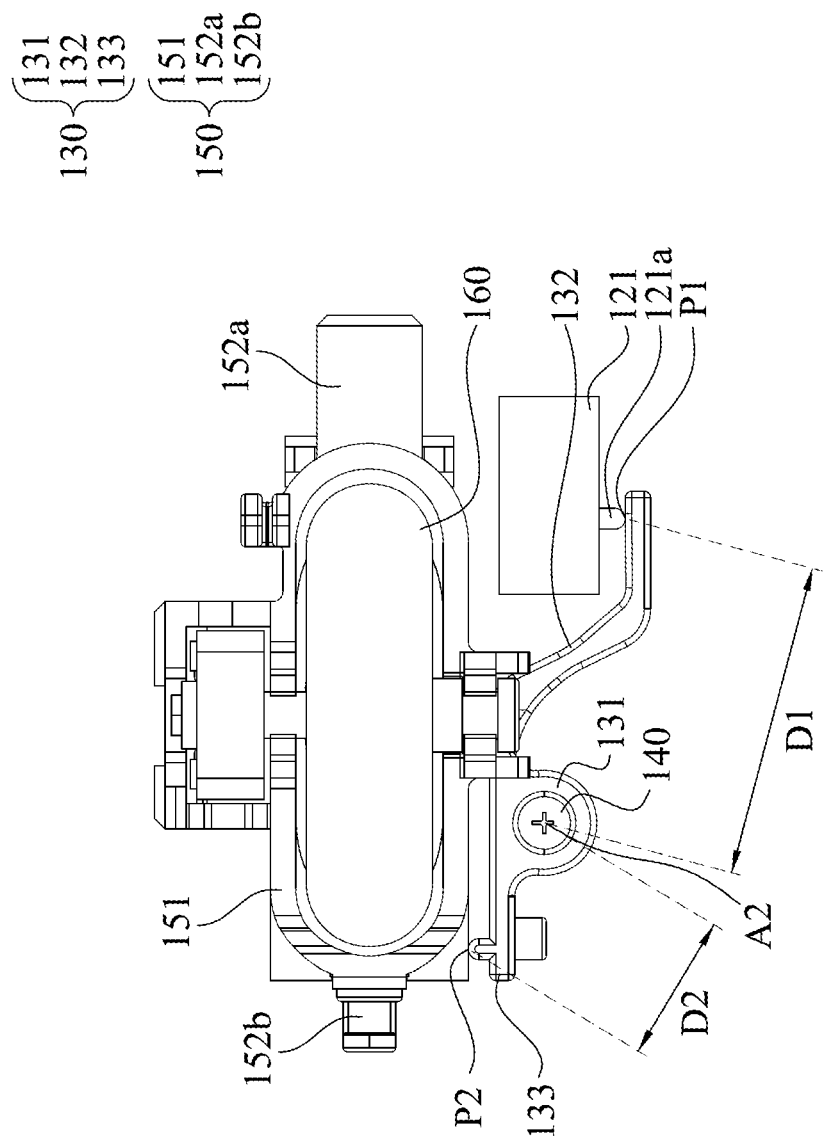
FIG. 4 is a top view of some components in FIG. 2.

Reference is made to FIG. 4. FIG. 4 is a top view of some components in FIG. 2. As shown in FIG. 4, in the present embodiment, the first extending portion 132 of the swing arm 130 has a contact point P1 contacting the button 121a of the keyswitch 121. The second extending portion 133 of the swing arm 130 has a trigger point P2 configured to be forced by the wheel seat 150. In the present embodiment, the trigger point P2 is a protrusion protruding from a surface of the second extending portion 133 facing the wheel seat 150 and is in contact with the wheel seat 150. A distance from the contact point P1 to the rotation axis A2 of the swing arm 130 is greater than a distance from the trigger point P2 to the rotation axis A2. In this way, it is possible to increase the swing distance and applied force of the wheel seat 150 when the keyswitch 121 is to be triggered, thereby reducing the accidental trigger of the keyswitch 121 when the wheel 160 is vertically pressed. However, the present disclosure is not limited to this embodiment. In some embodiments, the second extending portion 133 of the swing arm 130 is in surface contact with the wheel seat 150, so there is no specific trigger point. In some embodiments, the trigger point P2 can also be changed to be disposed on a surface of the wheel seat 150 facing the second extending portion 133 and abut against a surface of the second extending portion 133.

In some embodiments, as shown in FIG. 2, the housing 110 further includes a blocking wall 112. The blocking wall 112 is disposed on the bottom board 111. The mouse device 100 further includes a position-returning member 170. The position-returning member 170 is disposed between a side of the second extending portion 133 away from the wheel seat 150 and the blocking wall 112, and is configured to return the second extending portion 133 toward the wheel seat 150. It can be seen that, in addition to the button 121a of the keyswitch 121 that can rebound to return the swing arm 130, this embodiment can also use the position-returning member 170 to ensure that the swing arm 130 can be returned to the position thereof.

In some embodiments, the blocking wall 112 and the bottom board 111 form a unitary structure made of plastic through an injection molding process, but the present disclosure is not limited in this regard. In some embodiments, the blocking wall 112 and the bottom board 111 are a two-piece structure (i.e., not integrally formed), and the blocking wall 112 is fixed to the bottom board 111 by insertion, for example.

In some embodiments, the position-returning member 170 is a compression spring, but the disclosure is not limited in this regard.

Reference is made to FIGS. 5 and 6. FIG. 5 is a partial perspective view of some components of the mouse device 100 according to another embodiment of the present disclosure. FIG. 6 is a perspective view of a swing arm 230 in FIG. 5. As shown in FIGS. 5 and 6, in the present embodiment, the bottom board 111, the circuit board 120, the fixing member 140, the wheel 160, and the position-returning member 170 are the same as those in the embodiment shown in FIG. 2. Therefore, the related description of these components can be referred to the foregoing contents and will not be repeated here. Compared with the embodiment shown in FIG. 2, the present embodiment is modified for the swing arm 230 and the wheel seat 250.

In detail, in the present embodiment, the wheel seat 250 includes an accommodating frame 251 and extending pillars 152a, 152b. Compared with the embodiment shown in FIG. 2, a side of the accommodating frame 251 of the present embodiment is provided with a first magnet 251a thereon. In addition, each swing arm 230 includes a pivotal portion 131, a first extending portion 132, and a second extending portion 233. Compared with the embodiment shown in FIG. 2, the second extending portion 233 of the present embodiment includes a second magnet 233a located on a side of the second extending portion 233 facing the wheel seat 250. Identical poles of the first magnet 251a and the second magnet 233a are opposite to each other. That is, the first magnet 251a and the second magnet 233a moving toward each other will increase the magnetic repulsion force. Hence, the wheel seat 250 that swings laterally toward the second extending portion 233 can use the magnetic repulsion force to move the second extending portion 233 in a non-contact manner, so as to rotate the swing arm 230 to achieve the purpose of triggering the keyswitch 121 by the first extending portion 132.

According to the foregoing recitations of the embodiments of the disclosure, it can be seen that in the mouse device of the present disclosure, the wheel seat can rotate the swing arm by swinging laterally, so as to press the button of the keyswitch through the rotating swing arm. Hence, the installation position of the keyswitch relative to the wheel seat can be arbitrarily changed by adjusting the appearance of the swing arm, thereby effectively increasing the flexibility of the internal component layout and the space utilization efficiency of the mouse device. By making the distance between the contact point between the swing arm and the button and the rotation axis of the swing arm greater than the distance from the trigger point between the wheel seat and the swing arm to the rotation axis, the force required to be applied and the distance to be swayed when the wheel seat triggers the keyswitch can be increased, thereby reducing the accidental trigger of the keyswitch when the wheel is vertically pressed. By designing the insertion groove on the supporting structure on the bottom board for inserting the insert piece of the extension pillar of the wheel seat, the wheel seat can be effectively prevented from swinging when the wheel is vertically pressed, thereby avoiding accidentally triggering the keyswitch.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mouse device, comprising:
   a housing comprising a bottom board;
   a keyswitch located over the bottom board and comprising a button;
   a swing arm comprising:
      a pivotal portion pivotally connected to the bottom board;
      a contact point contacting the button; and a trigger point, wherein a distance from the contact point to a rotation axis of the swing arm is greater than a distance from the trigger point to the rotation axis;

a wheel seat located over the bottom board and configured to laterally swing toward the swing arm to force the trigger point, so as to rotate the swing arm to press the button by the contact point, wherein the swing arm is located at a side of the wheel seat; and a wheel rotatably disposed in the wheel seat.

2. The mouse device of claim 1, wherein the swing arm abuts against the wheel seat.

3. The mouse device of claim 1, wherein the wheel seat comprises a first magnet, the swing arm comprises a second magnet, and identical poles of the first magnet and the second magnet are opposite to each other.

4. The mouse device of claim 1, further comprising a position-returning member disposed at a side of the swing arm away from the wheel seat and configured to return the swing arm toward the wheel seat.

5. The mouse device of claim 4, wherein the housing further comprises a blocking wall disposed on the bottom board, the swing arm is located between the wheel seat and the blocking wall, and the position-returning member is disposed between the swing arm and the blocking wall.

6. The mouse device of claim 1, wherein the keyswitch and the wheel seat are located at an identical side of the swing arm.

7. The mouse device of claim 1, wherein the housing further comprises a supporting structure disposed on the bottom board and comprising two retaining walls, the wheel seat comprises an extending pillar, and the extending pillar is retained between the two retaining walls.

8. The mouse device of claim 7, wherein the extending pillar comprises an insert piece, an accommodating groove and an insertion groove communicated to each other are formed between the two retaining walls, the accommodating groove accommodates a part of the extending pillar, and the insertion groove is located between the accommodating groove and the bottom board and configured to be inserted by the insert piece.

9. The mouse device of claim 8, wherein when the insert piece is located outside the insertion groove, the extending pillar is rotatably retained between the two retaining walls, and when the insert piece inserts into the insertion groove, the insert piece is engaged between two inner walls of the insertion groove.

10. The mouse device of claim 8, wherein a junction between the accommodating groove and the insertion groove has a chamfered structure.

11. The mouse device of claim 1, further comprising:
another keyswitch located over the bottom board and comprising another button; and
another swing arm comprising another pivotal portion pivotally connected to the bottom board;
wherein the another swing arm is located at another side of the wheel seat, and the side and the another side of the wheel seat are opposite to each other.

12. The mouse device of claim 1, wherein the swing arm further comprises:
a first extending portion connected to the pivotal portion, wherein the contact point is on the first extending portion; and
a second extending portion connected to the pivotal portion, wherein the trigger point is on the second extending portion.

* * * * *